A. W. GRAY.
Grain-Separators.

No. 166,456. Patented Aug. 10, 1875.

Witnesses.
W. E. Chaffa
Edmund Masson

Inventor.
Albert W. Gray.
By atty A. B. Stoughton.

UNITED STATES PATENT OFFICE.

ALBERT W. GRAY, OF MIDDLETOWN, VERMONT, ASSIGNOR TO HIMSELF, LEONIDAS GRAY, AND ALBERT Y. GRAY, OF SAME PLACE.

IMPROVEMENT IN GRAIN-SEPARATORS.

Specification forming part of Letters Patent No. 166,456, dated August 10, 1875; application filed March 6, 1875.

*To all whom it may concern:*

Be it known that I, ALBERT W. GRAY, of Middletown, in the county of Rutland and State of Vermont, have invented certain new and useful Improvements in Machines for Threshing, Cleaning, or Separating Grain; and I do hereby declare the following to be a full, clear, and exact description of the same, reference being had to the accompanying drawings, making a part of this specification, in which—

Figure 1:
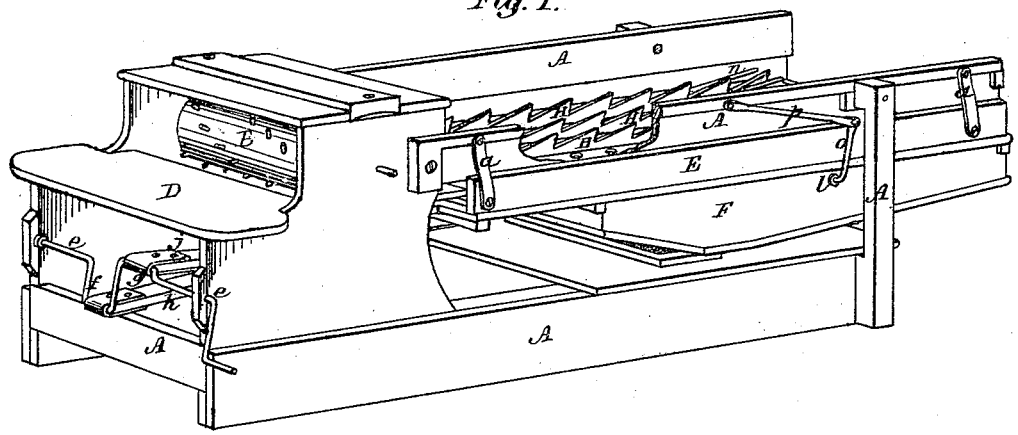
Figure 2:
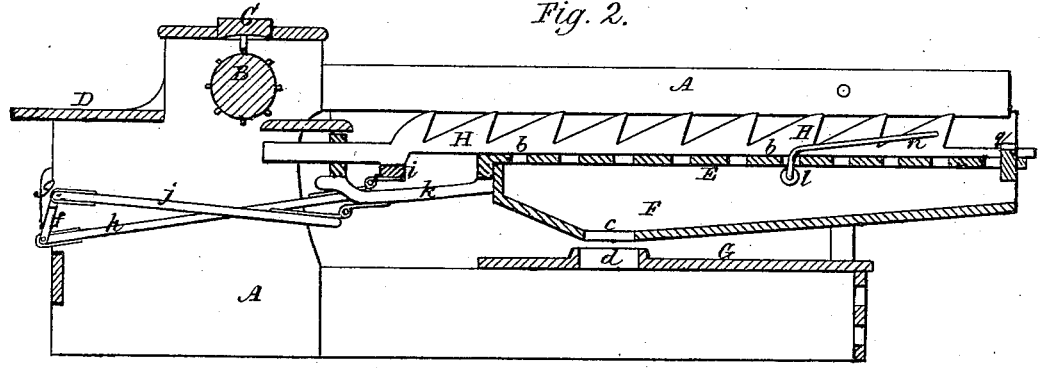
Figure 3:
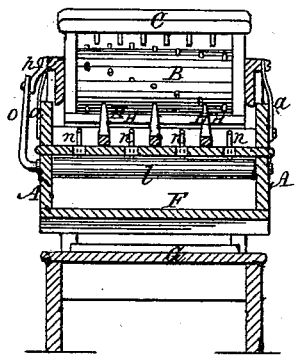

Figure 1 represents a perspective view of the machine. Fig. 2 represents a longitudinal vertical section.

Although I have called my invention an improvement in machines for thrashing, cleaning, or separating grain, yet, in reality, the invention relates more specifically to the separation of grain from the straw, the former passing to the cleaning apparatus, and the latter out of the rear end of the machine; and my invention consists in the combination of a single shaft, having a short and long crank thereon, arranged oppositely to each other, a shaker with serrated, hooked, or shouldered straw-movers, both shaker and straw-mover reciprocating in contrary directions, and the latter faster or farther than the former, so as to shake out the grain from the straw, and carry the straw out of the machine; and my invention further consists in the combination of the shaker and straw-carrier, moving in contrary directions and with different velocities, the vertically-reciprocating fingers for raising and holding the straw when the carrier is moving in the direction opposite to that in which the straw is to go, and dropping as the straw is carried forward, as will be explained.

The main frame of the machine is shown at A, and in front of this frame is placed the thrashing-cylinder B, which runs in connection with a spiked concave, C, placed above it. D is the table, from which the grain is fed to the thrashing-cylinder. To the main frame is suspended, by straps $a\ a$, the shaker E, which has a perforated bottom, $b$, through which the grain and other small material may drop into a receiver, F, whence it passes through an opening, $c$, in said receiver, and an opening, $d$, through the floor G, and from thence is taken to the cleaning-machine. The straw that is thrown over by the thrashing-cylinder into the shaker is advanced toward the rear of the machine by the serrated, hooked, or shouldered bars H, which have a reciprocating motion imparted to them, as will be explained in connection with the shaker, which is also reciprocated. At the front of the machine there is a shaft, $e$, driven by horse or any other power, and from this shaft motion may be communicated to all the moving parts of the machine, including the threshing-cylinder; or the first moving power may be connected with the thrashing-cylinder, and the shaft $e$ driven from said cylinder. On the shaft $e$ there are two cranks, $f\ g$, the former of greater length than the latter. To the crank $f$ is attached one end of a connecting-bar, $h$, the other end of which is attached to a cross-head, $i$, to which the several hooked bars or straw carriers or pushers H are fastened; and to the other and shorter crank $g$ is connected one end of a pitman or connecting-rod, $j$, the other end of which is attached to the shaker E through the medium of a brace-piece, $k$. The cranks $f\ g$ are, moreover, arranged at right angles to each other, so that the straw pusher and shaker, while traveling different distances, shall also move in contrary directions. The object of the difference of distance moved over, and the moving of these two parts in contrary directions, is, that while the grain is shaken out of the straw the latter may be carried out of the machine with great rapidity, and thus avoid its liability to choke or clog near the threshing-cylinder. To still further prevent any retention or improper movement of the straw in any direction except out of the machine, I arrange a rock-shaft, $l$, in the shaker, to which the fingers $n$ are attached, and extend up into the path of the outgoing straw. To this rock-shaft is attached an arm, $o$, to which an arm, $p$, fastened to the main frame, is connected, so that as the shaker moves this rock-shaft will roll, and in so doing vibrate the fingers $n$; and the motions of these fingers is so timed that as the pushers move toward the thrashing-cylinder these fingers rise up and hold the straw from moving in that direction;

and, when the pushers move in the direction in which the straw is to pass out of the machine, then the fingers drop down out of the way. In the rear ends of the pushers, where they move under the guides $q$, shoulders $r$ are cut, so as to push out any grain or straw that might lodge under said guides, and keep them clear.

Having thus fully described my invention, what I claim is—

1. The combination of the single shaft $e$, with its long and short cranks $f\ g$, arranged opposite to each other, the pitmen $h\ j$, the serrated bars or straw-pushers H, and the shaker or screen E, for moving said pusher and screen simultaneously in contrary directions, the former faster and farther than the latter, as and for the purpose described.

2. In combination with the serrated straw-pusher and the screen, moving in contrary directions, the former faster and farther than the latter, the vibrating fingers $n$, operated, in connection therewith, as and for the purpose described.

ALBERT W. GRAY.

Witnesses:
ALBERT A. CLARK,
ROBERT R. WOODWARD.